US012617091B2

(12) United States Patent
Zhang et al.

(10) Patent No.: US 12,617,091 B2
(45) Date of Patent: May 5, 2026

(54) SAFETY FEATURES FOR A ROBOT ASSEMBLY AND METHOD OF SAME

(71) Applicant: MAGNA POWERTRAIN GMBH & CO KG, Lannach (AT)

(72) Inventors: Zixu Zhang, Plainsboro, NJ (US); Rajeev Verma, Troy, MI (US); Alexander Zak, Troy, MI (US)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 197 days.

(21) Appl. No.: 18/279,941

(22) PCT Filed: Mar. 4, 2022

(86) PCT No.: PCT/US2022/018921
§ 371 (c)(1),
(2) Date: Sep. 1, 2023

(87) PCT Pub. No.: WO2022/187629
PCT Pub. Date: Sep. 9, 2022

(65) Prior Publication Data
US 2024/0308071 A1      Sep. 19, 2024

Related U.S. Application Data

(60) Provisional application No. 63/156,434, filed on Mar. 4, 2021.

(51) Int. Cl.
B25J 9/16          (2006.01)

(52) U.S. Cl.
CPC ........... B25J 9/1666 (2013.01); B25J 9/1697 (2013.01)

(58) Field of Classification Search
CPC ...... B25J 9/1653; B25J 9/1664; B25J 9/1666; B25J 9/1669; B25J 9/1674; B25J 9/1676; B25J 9/1692; B25J 9/1694; B25J 9/1697
See application file for complete search history.

(56) References Cited

U.S. PATENT DOCUMENTS

| | | | |
|---|---|---|---|
| 2016/0129592 A1* | 5/2016 | Saboo | ...................... B25J 5/007 700/248 |
| 2019/0236370 A1 | 8/2019 | Man | |
| 2020/0189103 A1 | 6/2020 | D'Ercoli et al. | |
| 2021/0023719 A1* | 1/2021 | Alt | ......................... B25J 9/1697 |
| 2023/0277271 A1* | 9/2023 | Lavallée | ................ A61B 90/50 700/254 |
| 2023/0415363 A1* | 12/2023 | Nakada | ..................... G06T 7/62 |

* cited by examiner

*Primary Examiner* — Spencer D Patton
(74) *Attorney, Agent, or Firm* — DICKINSON WRIGHT PLLC

(57)          ABSTRACT
A robot assembly for safe operation in a manufacturing setting with humans including a sensor for detecting movement of the robot assembly and a human location. A positional apparatus including at least one tag located on the robot apparatus and at least one detector for detecting the tag. Posture nodes associated with a human saved in memory. A method that includes, generating a task movement plan based on images captured by the sensors, tags detected by the detector, and posture nodes of a nearby human captured by the sensor.

14 Claims, 12 Drawing Sheets

$$AX = YB$$

$$T_{end}^{world}T_{hand}^{end} = T_{camera}^{world}T_{hand}^{camera}$$

$$x_i^*, x_j^* = \arg \max_{x_i, x_j} p(z_{ij}|x_i, x_j)$$

$$x_i^*, x_j^* = \arg \min_{x_i, x_j} \|e_{ij}(x_i, x_j)\|_{\Omega_{ij}}$$

$$X^* = \arg\min_{X} \sum_{z_{ij} \in Z} \|e_{ij}(x_i, x_j)\|_{\Omega_{ij}}$$

SAFETY FEATURES FOR A ROBOT ASSEMBLY AND METHOD OF SAME

CROSS-REFERENCE TO RELATED APPLICATIONS

This U.S. National Stage Patent Application claims the benefit of PCT International Patent Application Serial No. PCT/US2022/018921 filed Mar. 4, 2022 entitled "SAFETY FEATURES FOR A ROBOT ASSEMBLY AND METHOD OF SAME" which claims the benefit of and priority to U.S. Provisional Patent Application Ser. No. 63/156,434, filed Mar. 4, 2021 and titled "Safety Features for a Robot Assembly and Method of Same," the entire disclosures of which are hereby incorporated by reference.

BACKGROUND OF THE INVENTION

1. Field of the Invention

The present invention relates to robots in manufacturing environment. More particularly, the present invention relates to safety features for robots used in a manufacturing environment.

2. Related Art

This section provides background information related to the present disclosure which is not necessarily prior art.

As productivity and efficiency are the goals in any manufacturing environment, robots are being utilized, now more than ever, for a greater number of tasks. Conventional robots are known to weld, assemble, and move workpieces between locations, whereas humans typically perform more complicated tasks that require recognition of several types of objects. While there is typically some overlap between an area in which a robot is operating and an area in which a human is working, robots have traditionally operated within the confines of highly-controlled environments. In highly controlled environments, robots can be programed to execute repeated and preprogramed tasks with limited risks of damaging nearby environments. However, with improvements in technology, modern robots are now being programmed to perform more and more advanced tasks similar to those of a human. With these advanced tasks, robots are now being placed in close confines with humans and with higher degrees of freedom than ever before. The major concern of introducing robots to a manufacturing environment where humans are working is safety. Specifically, the concern is that a robot's movement and a human's movement will intersect; causing a collision that ultimately harms the human or damages the robot. The main goal of using robots is productivity that, in theory, will recoup the large initial cost of buying the robots. Productivity requires these robots to perform tasks quickly, but the faster a robot performs a task, the higher the magnitude of potential harm to both the robot and the human during a collision. As is often times the case, an attempt to create a safer setting for humans detrimentally affects productivity.

Various strategies have been employed to create safer manufacturing environments. One strategy is to create a physical barrier around an area in which the robot operates so that a human must remain a safe distance away. This method, while simple, requires additional space in the manufacturing environment and is generally over restrictive, particularly for robots that move between locations.

All of these strategies slow productivity and are not guaranteed to avoid collision with a human, particularly a human that is moving. Moreover, even when a human is standing in one place, their upper body or a carried object will move as required for that given task creating an area of risk beyond what is anticipated. Accordingly, there exists a need to advance the art such that neither safety nor productivity must suffer.

SUMMARY OF THE INVENTION

According to one aspect of the invention, a method for operating a robot assembly to prevent collision with a human in a manufacturing setting is provided. The method includes the steps of: providing a robot assembly with a positional apparatus having at least one tag; performing predefined movements with the robot assembly associated with an assigned task; and detecting the at least one tag on the positional apparatus with a detector and generating a movement model of the robot assembly.

In one aspect, the method includes replacing the positional apparatus with a robotic hand configured to perform tasks associated with the movement model.

In one aspect, the positional apparatus includes a plurality of sides with each side including at least one tag.

In one aspect, each of the sides includes at least two distinct tags.

In one aspect, the method includes capturing a plurality of images of the robot assembly during the assigned task.

In one aspect, the method includes extrapolating 3D information from the plurality of images.

In one aspect, the method includes generating posture nodes associated with a human.

In one aspect, the method includes determining a range of motion of the human.

In one aspect, the method includes detecting a human approaching the robot assembly during performance of the predetermined task.

In one aspect, the method includes stopping or changing the performance of the predefined task in response to detecting the human approaching.

In another aspect, a vision processing method is provided, including the steps of: capturing a plurality of images of a robot assembly having a plurality of tags coupled to the robot assembly; processing the plurality of images and determining a hazard present within a working environment; extrapolating 3D information from the plurality of images; and continuously capturing additional images and, in response thereto, modifying a predetermined movement of the robot assembly.

In one aspect, the method includes modeling human posture and generating a plurality of posture nodes.

In one aspect, the method includes capturing images of a human working in close proximity with the robot assembly.

In one aspect, the method includes extrapolating 3D information from the images of the human working and determining the hazard is present.

In another aspect, a method of calibrating a robot assembly is provided, the method including: generating operating instructions for a robot assembly corresponding to a predetermined task and waypoint; moving the robot according to the operating instructions and the predetermined task and waypoint; detecting a plurality of locations of a positional apparatus of the robot assembly; extrapolating locations of the positional apparatus after detecting the plurality of locations; after extrapolating the locations, detecting precise locations of the positional apparatus; comparing the precise locations with the extrapolated locations and generating pose nodes; accumulating pose nodes for a plurality of positions of the robot assembly and generating a movement model of the robot assembly.

In one aspect, the method includes generating bypass information differing from the movement model for avoiding an object entering the waypoint.

In one aspect, the method includes departing from the movement model according to the bypass information in response to detecting a hazard.

In one aspect, the method includes identifying a variance between the extrapolated locations and the precise locations and reducing the variance by modifying the extrapolated location with the precise locations.

In one aspect, the method includes predicting an object overlapping with the robot assembly during performance of the predetermined task and initiating safety protocols in response thereto.

In another aspect, a system for operating a robot assembly is provided, the system including at least one computing device having at least one processor and at least one memory having instructions stored thereon that, when executed by the at least one processor, cause the at least one processor to perform the methods described above and herein.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein.

DESCRIPTION OF THE ENABLING EMBODIMENT

Example embodiments will now be described more fully with reference to the accompanying drawings. In general, the subject embodiments are directed to a robot assembly and a method of operation. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Referring to the Figures, wherein like numerals indicate corresponding parts throughout the views and charts, the robot assembly and the method of operation are intended for preventing collision between robots and environments, such as human workers, while maintaining robot efficiency and productivity in a manufacturing environment.

Figure 1:
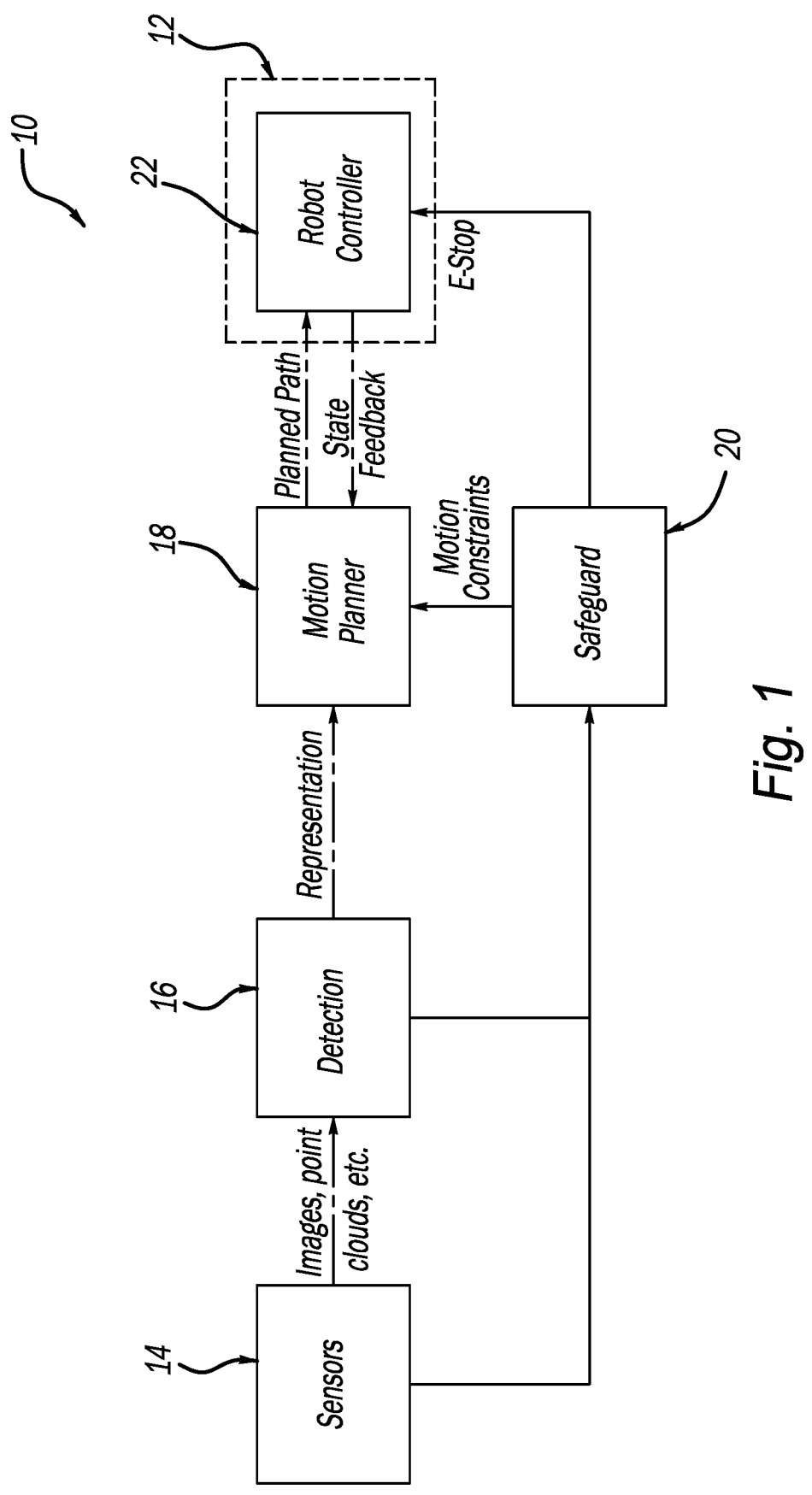
FIG. 1 is a schematic view of a safeguard system wherein a robot assembly receives continued feedback during operation.

With Reference initially to FIG. 1, a schematic view of a safeguard system 10 is provided, wherein a robot assembly 12 receives continued feedback during operation. The safeguard system 10 includes a series of sensors 14 that detect one or more environmental hazards within a working environment 16. For example, the hazards within a working environment 16 may include moving and non-moving hazards, such as humans, other robots, environmental infrastructures, and other hazards. A motion planner 18 includes a predetermined or preprogramed travel path instruction that may be stored locally at the robot assembly or remotely. A safeguard module 20 may bypass the travel path and/or motion planner 18 instructions in the event of detecting the one or more hazards within a working environment 16. The robot assembly 12 may include a controller 22 for receiving information from the sensors 14, the motion planner 18, and the safeguard module 20 for preventing movement of the robot assembly 12 upon a sensed or detected hazard within a working environment 16. For example, the robot assembly 12 may move in accordance with travel path instructions provided by the motion planer 18, during movement, the sensors 14 may sense or detect one or more hazards within a working environment 16 that pose a risk of collision if the robot assembly 12 continues along the travel path. Upon a threat of collision, the safeguard module 20 constrains continued movement along the travel path. The constraint on movement may include generating and selecting a bypass travel path. The safeguard module 20 may work in conjunction with the controller 22.

Figure 2:
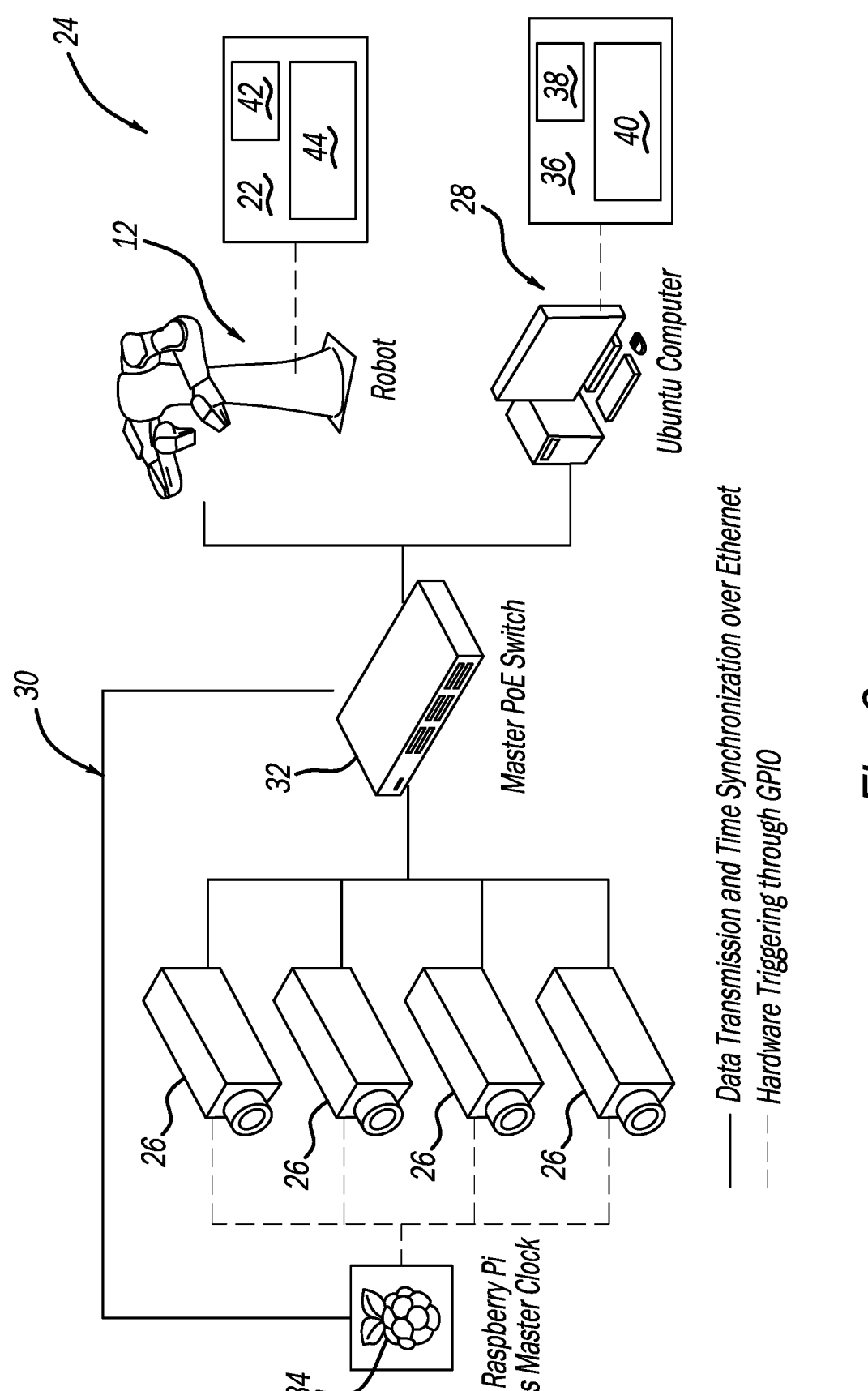
FIG. 2 is a schematic view of a robot assembly computing system.

FIG. 2 is a schematic view of a computing system 24 of the robot assembly 12. The computing system 24 includes a plurality of sensors, such as cameras 26 that have been synchronized and synchronously transmit data to a computing device 28. The cameras may include Blackfly S cameras transmitting data via a network 30, such as a local area network consisting of one or more Ethernet cables. The network 30 may include a Power over Ethernet (PoE) configuration including a master POE switch 32. Data from the cameras 26 may then be transmitted to the computing device 28. The cameras 26 may be synchronized via a master clock 34 that connects to the POE switch 32 and the cameras 26. For example, the master clock 34 may include a Raspberry Pi device that is triggered via general purpose input/output (GPIO) between the cameras 26 and Raspberry Pi device. The computing device 28 may include a controller 36 that includes a processor 38 and a memory 40. The memory 40 may include instructions that, when executed by the processor 38, cause the processor 38 to perform various functionalities, for example, movement of the robot assembly 12. It should also be appreciated that the controller 22 may also include a processor 42 and a memory 44. The memory 44 may include instructions that, when executed by the processor 42, cause the processor 24 to perform various functionalities, for example, movement of the robot assembly 12. The computing device 28 and controller 36 thereof may be configured to provide instructions to more than one robot assembly 12. In some embodiments, the memory 40 and 44 may in RAM, ROM, solid state, or any other type of storage. In some embodiments, the memory 40 and 44 may include GigE Vision and other protocols for transmitting one or more images from the cameras 26. In some embodiments, each camera 26 includes an ROS driver. In some embodiments, connection between cameras 26 the master clock 34, the robot 12, the master switch 32, and the computing device 28 may be wireless via known technologies such as Bluetooth.

Figure 3:
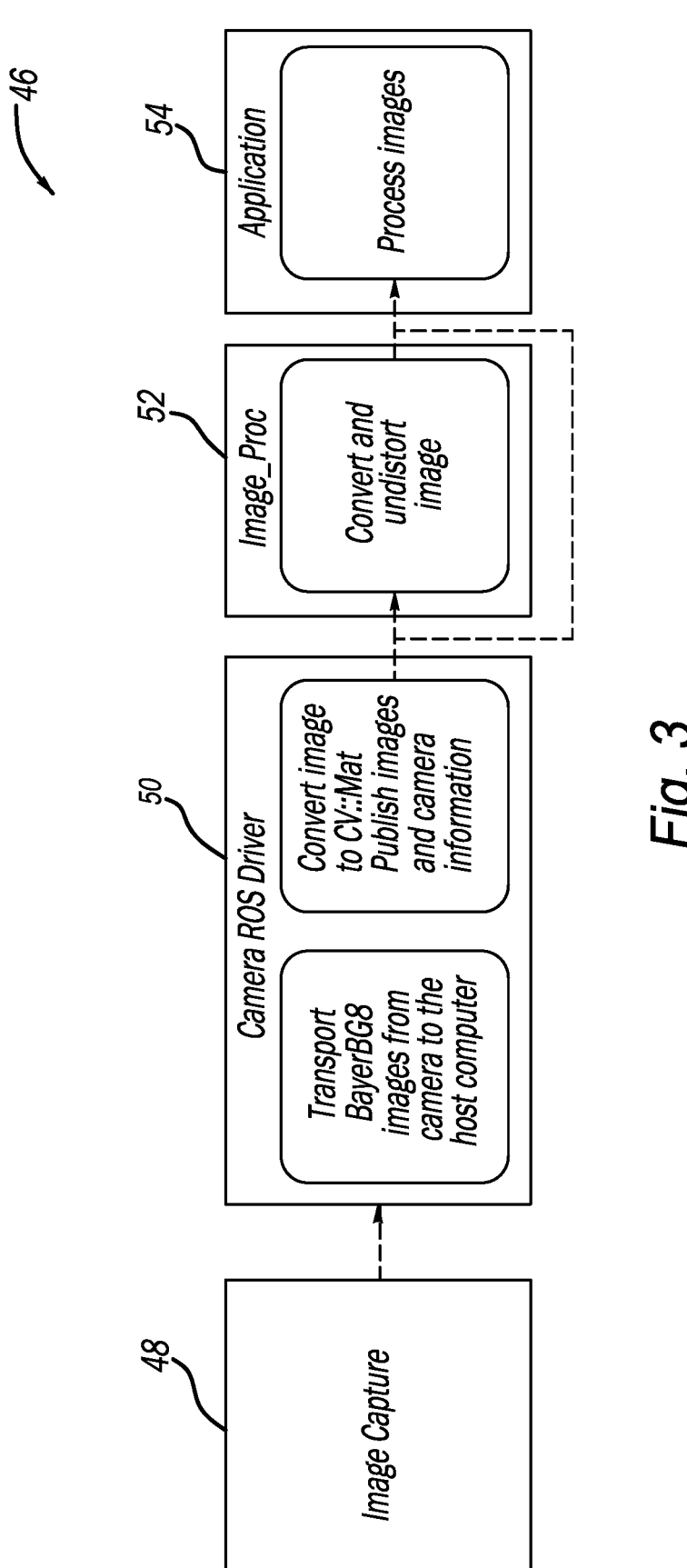
FIG. 3 is a schematic view of a vision processing method of the robot assembly.

FIG. 3 is a schematic view of a vision processing method 46 of the robot assembly 12. At 48, the vision processing method 46 includes capturing an at least one image. For example, the cameras 26 may capture a series of BayerB8 images. At 50, the images are transmitted from the cameras 26 to the computing device 28 whereat they are converted via instructions executed saved on memory 40 and carried out by the processor 38. For example, the images may be converted into a RGB format and published with additional camera information, such as time stamp, originating camera, etc. The image may then be undistorted at 52 if necessary. The undistorted image can then be processed at 54. For example, the computing device 24 may process the images and determine the presence of any hazards within a working environment 16. In some embodiments, each or select cameras 26 may include RGB cameras the steps 50, 52, and 54 may further include extrapolating 3D information from a series of 2D images for one or more of the cameras 26. For example, the memory 40 and 44 may include multi-view stereo (MVS) or structure through motion algorithms carried out by one or more of the processors 38 and 42.

Figure 4:
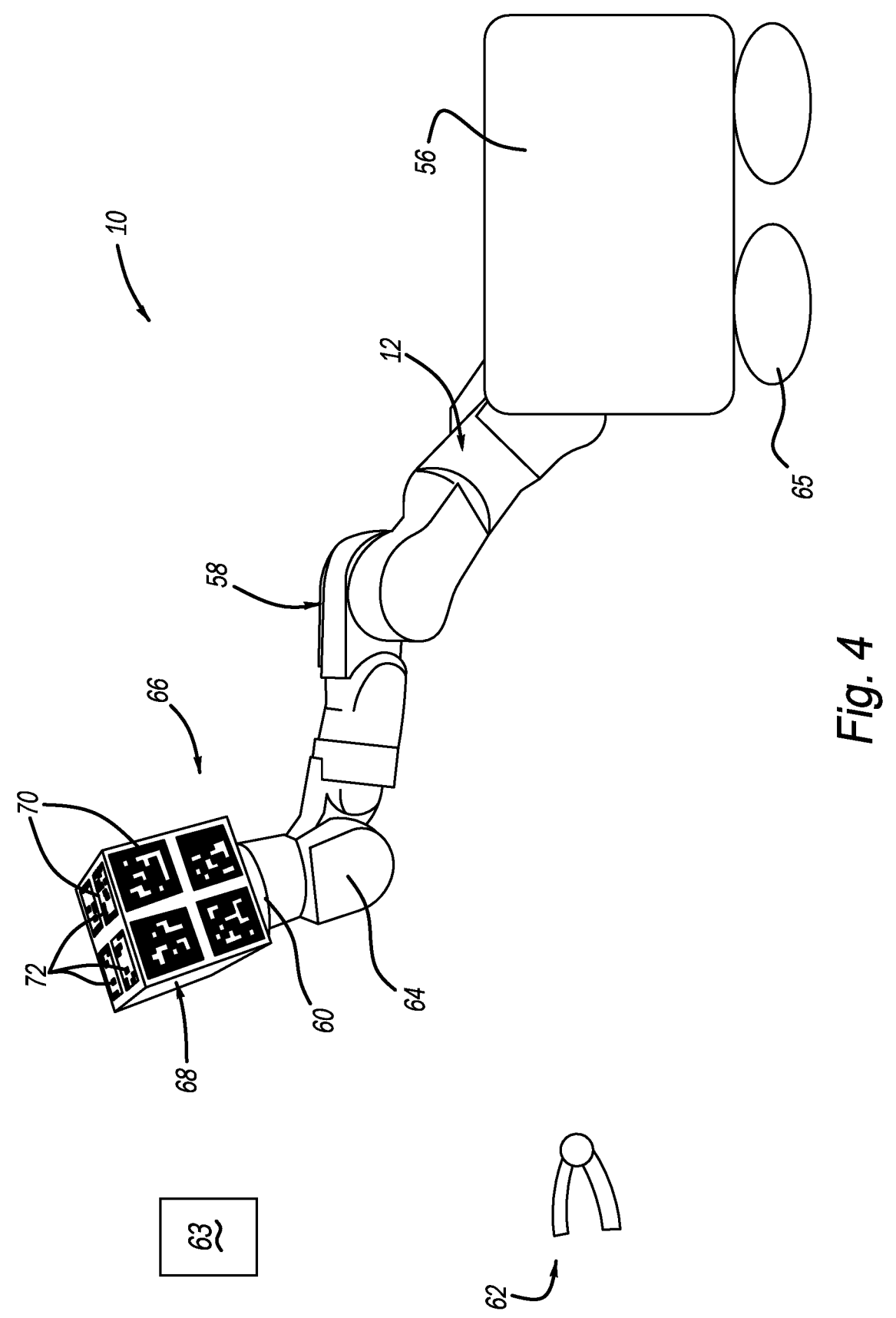
FIG. 4 is a perspective view of a robot assembly calibration system including a positional cube apparatus.

FIG. 4 is a perspective view of the robot assembly 12, the robot assembly 12 includes a base 56 and at least one arm 58 extending from the base 56 to an attachment location 60 for a robotic hand 62. The hand 62 performs certain operations via instructions from one or more of the processors 38 and 42. At least one joint 64 is located along the arm 58 for articulating the hand 62 along three dimensional routes. The base 56 include moveable elements 65, such as wheels or tracks, that permit the robot assembly 12 to move along travel paths between locations.

With continued reference to FIG. 4, the robot assembly 12 includes a calibration system 66 including a positional apparatus 68 for connection to the attachment location 60 during a calibration process. The positional apparatus 68 includes a plurality of sides 70, wherein each side 70 includes at least one tag 72 with distinguishing features. In some embodiments, the positional apparatus 68 is cube-shaped and at least five of the sides 70A-70E include more than one tag 72. For example, each of the sides 70A-70E may include four tags located in each quadrant of each of the sides. The positional apparatus 68 and/or spacing between tags 72 may correspond to the size of the hand 62 in its most expanded operational position, e.g., when fingers/clamps have been extended. In some embodiments, the tags 72 may be configured as April tags. One or more tag readers 63 may be configured to detect a location of each of the tags 72. The location detection of the tags 72 may be primarily or entirely for calibration before usage of the robot assembly 12 in a manufacturing environment.

Figure 5:
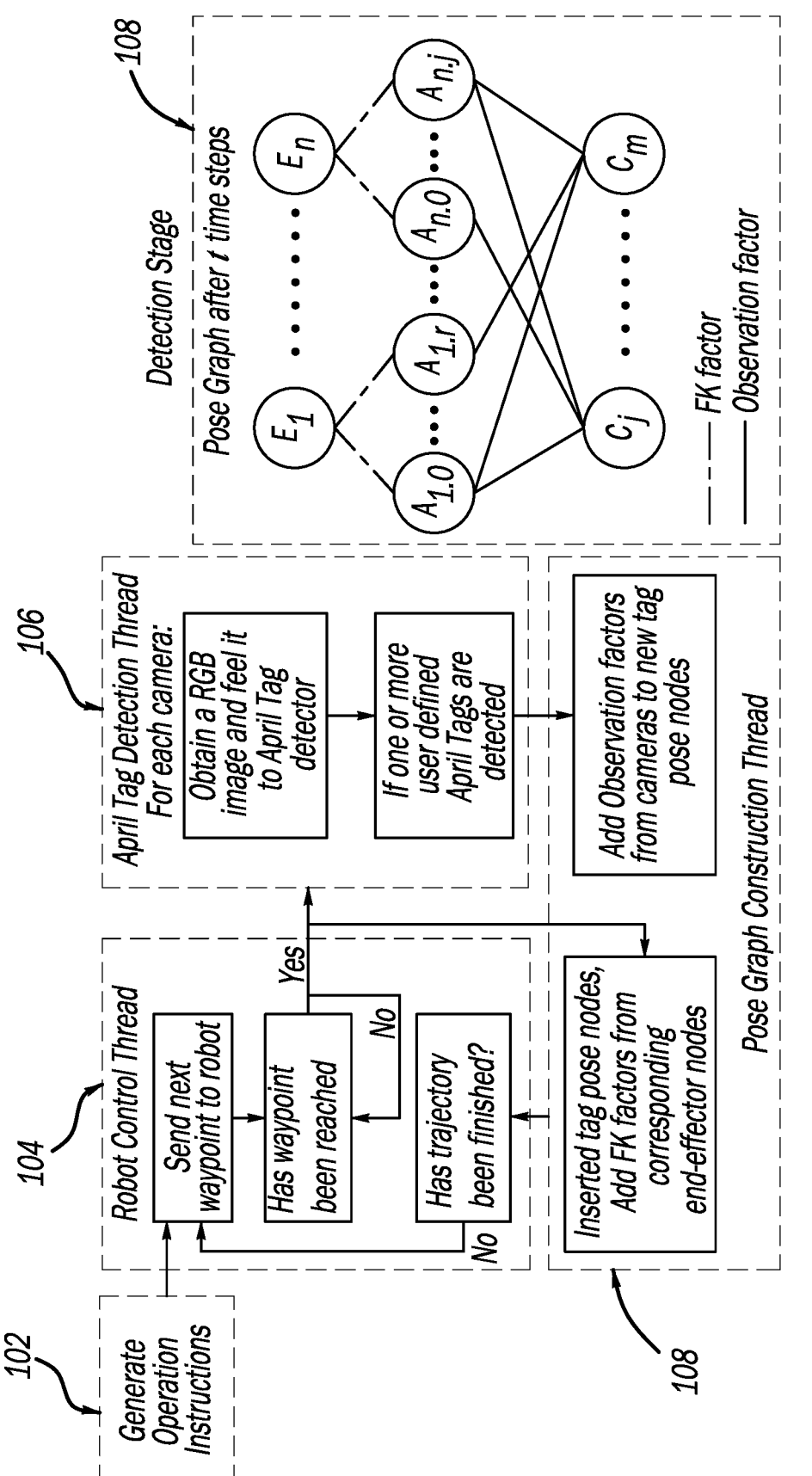
FIG. 5 is a schematic view of a calibration method.

A calibration method 100 is proved in FIG. 5 in accordance with the details provided in FIG. 4. The calibration method 100 includes generating operation instructions 102 for a robot assembly 12. For example, the operating instructions 102 may include one or more locations (e.g., waypoints) wherein certain tasks will be completed, such as organizing, sorting, etc. The robot assembly 12 is then instructed 104 to travel in accordance with the operation instruction. For example, the robot assembly 12 is instructed to travel between one or more locations to perform various tasks. Once the robot assembly 12 is located in a location to perform an assigned task, the robot assembly 12 moves in accordance with the assigned task wherein the positional apparatus 68 is detected 106. In some embodiments, the calibration method 100 include enough cameras 26 at locations that allow each of the tags 72 to be captured by more than one camera 26, such as at least three cameras 26. At 106, the images obtained by the cameras 26 are extrapolated into 3D information in accordance with the vision processing method 46 of FIG. 3. Based on the extrapolated information, an extrapolated location of the positional apparatus 68 may be generated. The extrapolated location of the positional apparatus 68 may include extrapolated locations of one or more tags 72. After generation of the 3D model, the one or more tags 72 may be detected via the one or more tag readers 63 for precise location of the positional apparatus 68 and one or more tags 72. The precise locational information may then be compared to the extrapolated locational information to generate pose nodes corresponding to the position of the robot assembly 12. These nodes can be accumulated for various positions of the robot assembly to generate a model at 108. At 108 the method 100 may include tagging nodes and saving them in memory 40 or 44. The variances between extrapolated locational information can then be reduced via a modification of the extrapolated locational information based on the precise locational information. With continued reference to step 108, a robot assembly activity profile of positional details vs time can be developed. The robot assembly activity profile may correspond to an activity at a given location and a given robot assembly task for establishing predictive locational information for the robot assembly. As such, objects entering a location that is predicted to have overlapping robot assembly movement can initiate safety module 20 protocols to provide bypass information to the robot assembly 12.

In some embodiments, the method 100 utilizes one positional apparatus 68 and four cameras. During method 100, an estimate is provided of Tend/tag as X, and Tworld/cam i as Y. Thus estimates may be generated for robot forward kinematics $$XT_{end}^{world} = T_{tag}^{world}$$

and camera observation $$T_{cam_i}^{world} Y_i = T_{tag}^{world}.$$

These estimates may be optimzed via SE(3) transformation parameterizations and smooth manifold optimizations with the Levenberg-Marquardt algorithm.

Figure 6:
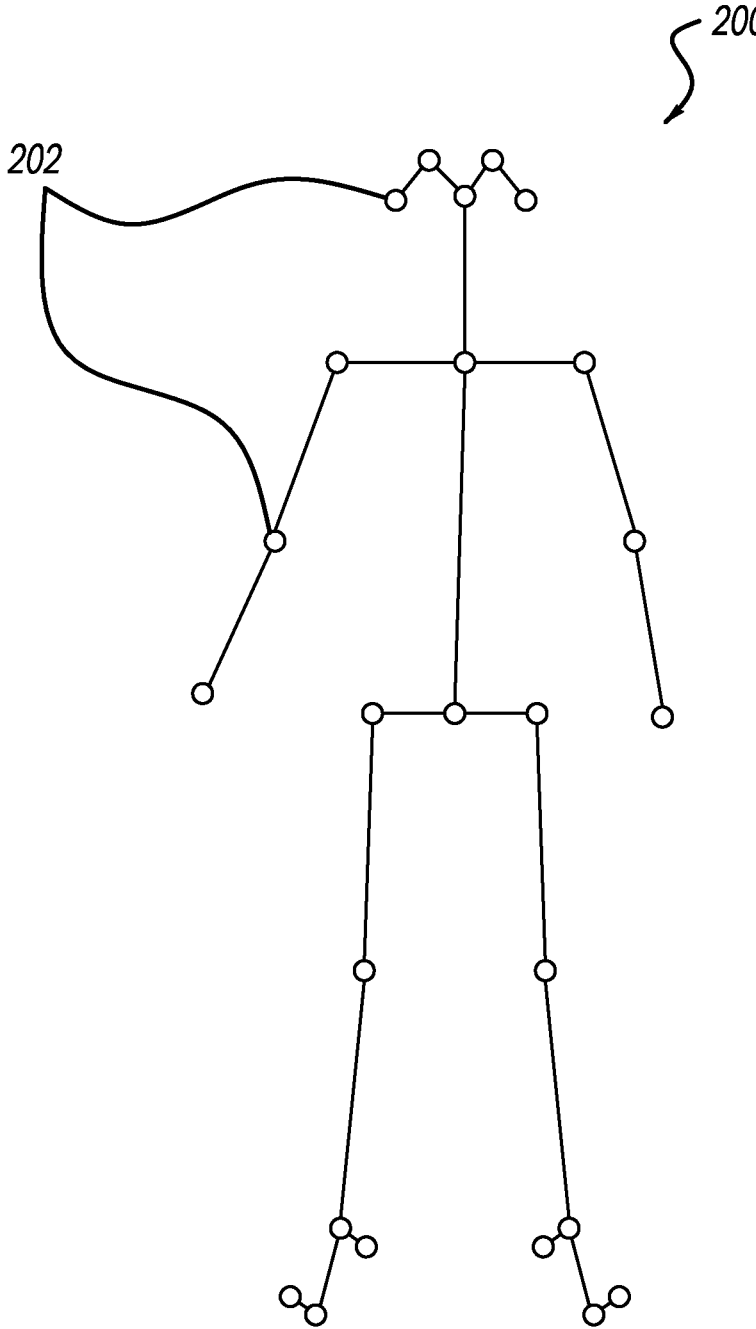
FIG. 6 is a schematic view of a base human figure to predict potential human positioning over a predetermined amount of time in accordance with the calibration system and the vision system.
Figure 7:
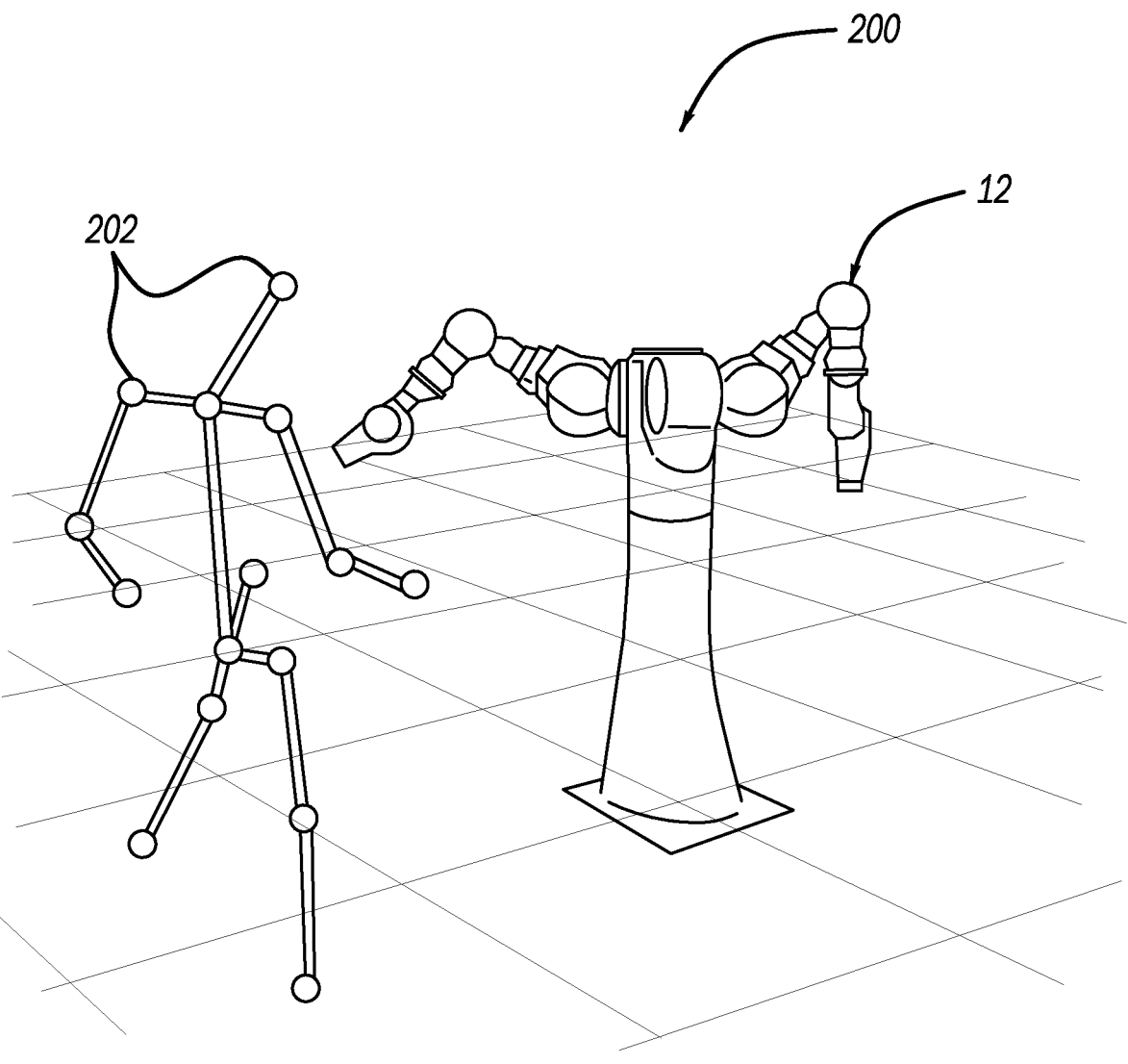
FIG. 7 is a schematic view of a system for human posture generation.

FIGS. 6 and 7 provide a system 200 for human posture generation. The system 200 incudes modeling the human body with a plurality of posture nodes 202. The posture nodes 202 may include nodes that correspond to the joints and the extension of various human appendages. In some embodiments, these posture nodes 202 may be used in the vision processing method 46. For example, the memory 40 and 44 may include instructions for generating the human posture with a plurality of human posture nodes. For example, the cameras 26 may capture images of a human working in close proximity to a robot assembly 12 or a location with a robot assembly activity profile. The method may include extrapolating 3D information from a series of 2D images of the human (or posture nodes 202) using extra multi-view stereo (MVS) or structure through motion algorithms carried out by one or more of the processors 38 and 42.

The posture nodes 202 may further be used to identify a human in a relaxed state, for example, standing upright arms resting against their body. However, based on the human's designated work task, their arms or legs may have to extend outwardly away from their body, or in some cases, the human may need to move an associated work object. These task oriented movements will cause the posture nodes 202 to extend outwardly. Distance from each identifiable posture node 202 of a human may be used to determine a range of motion, such that an identifiable threats of overlap and be predicted early and the system described herein can generate a bypass route.

Figure 8A:
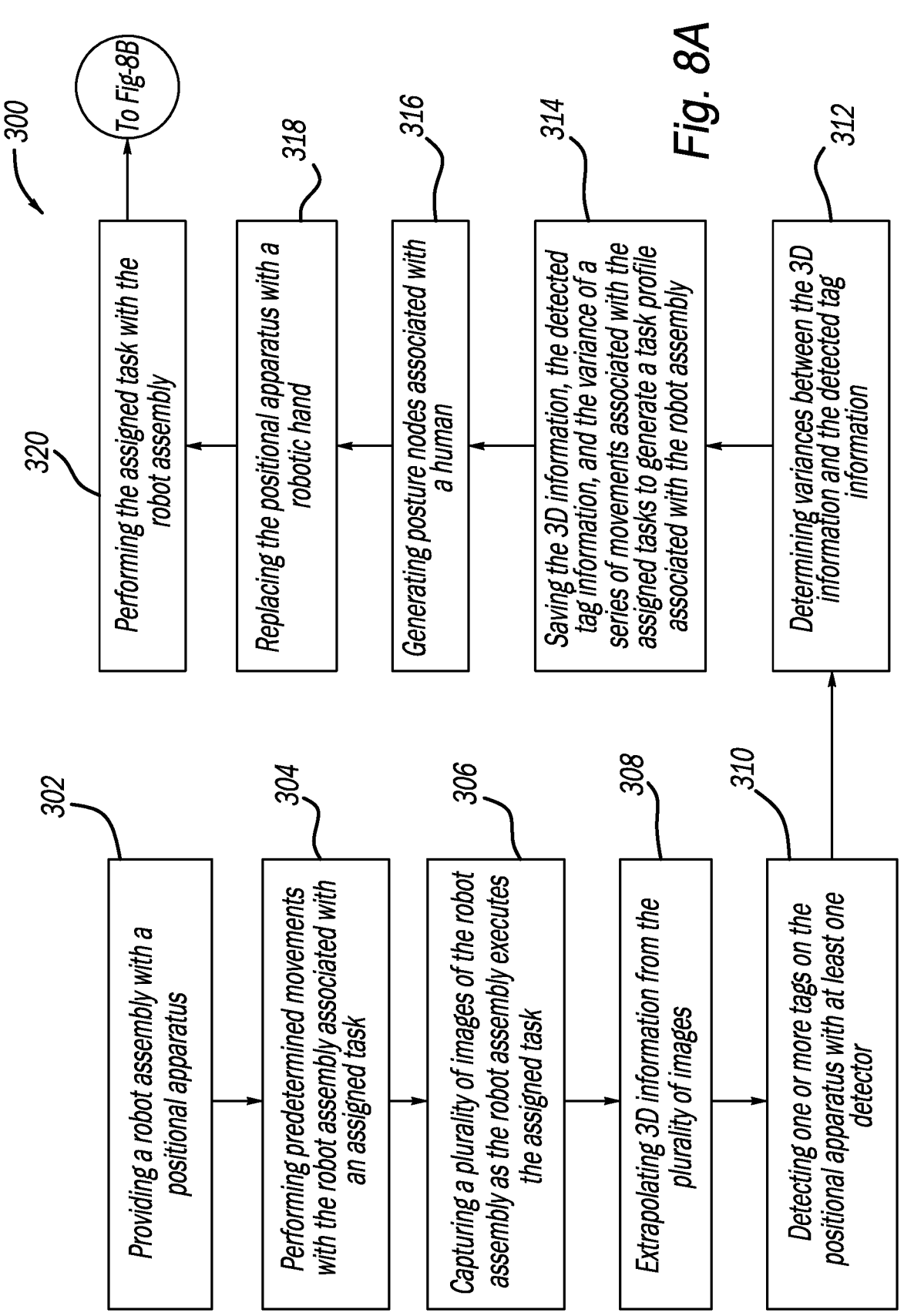
FIG. 8A is a first part of a schematic view of a method of operating a robot assembly in a hazardous environment.
Figure 8B:
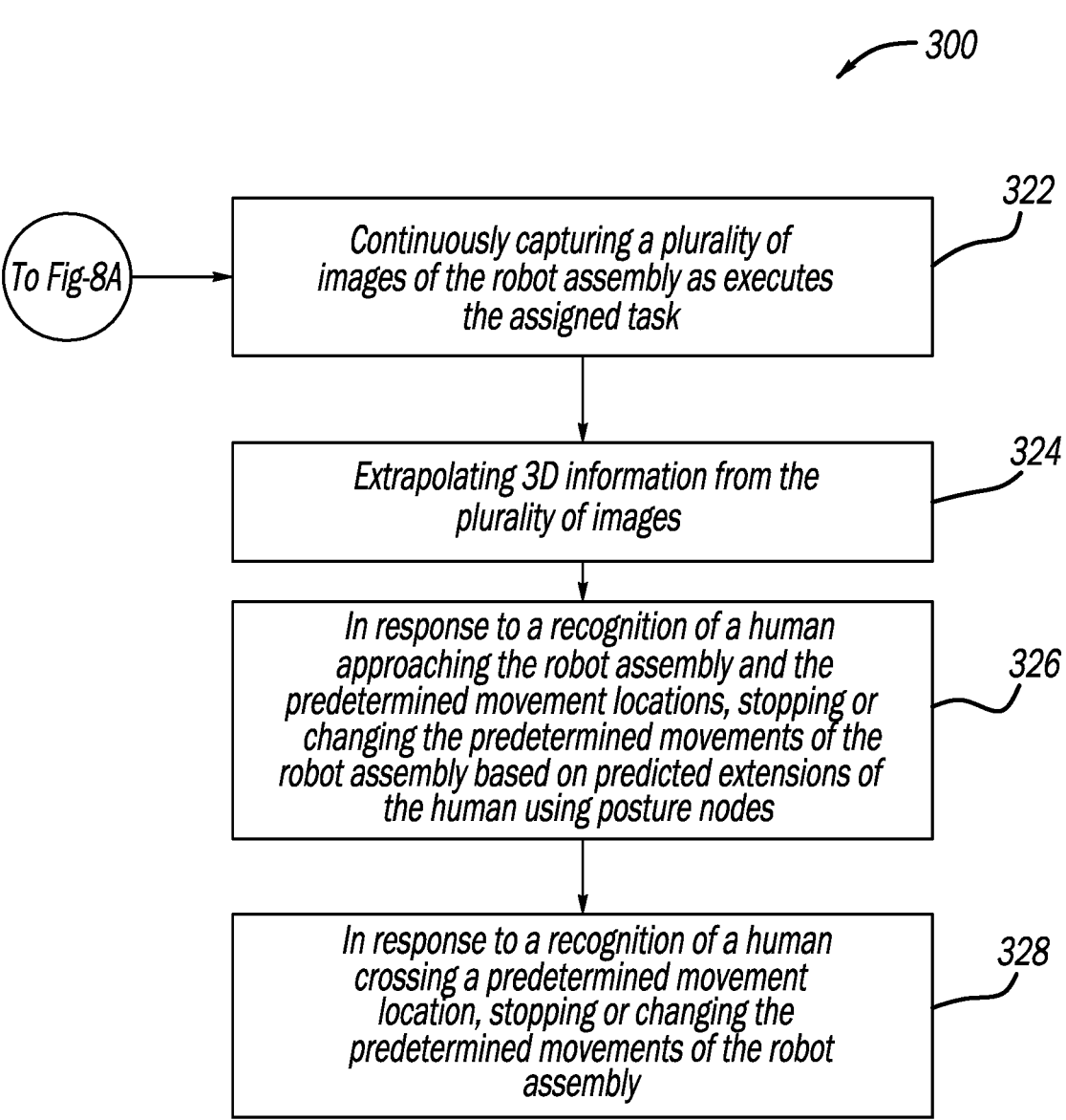
FIG. 8B is a second part of the schematic view of the method of FIG. 8A.

With reference now to FIGS. 8A-8B, a method 300 of operating a robot assembly in a hazardous environment is provided. At 302, the method 300 includes providing a robot assembly with a positional apparatus. At 304, the method 300 includes performing predetermined movements with the robot assembly associated with an assigned task. At 306, the method 300 includes capturing a plurality of images of the robot assembly as the robot assembly executes the assigned task. At 308, the method 300 includes extrapolating 3D information from the plurality of images. For example, determining a location of one or more tags on the positional apparatus. At 310, the method 300 includes detecting one or more tags on the positional apparatus with at least one detector. At 312, the method 300 includes determining variances between the 3D information and the detected tag information. At 314, the method 300 includes saving the 3D information, the detected tag information, and the variance of a series of movements associated with the assigned tasks to generate a task profile associated with the robot assembly. At 316, the method 300 includes generating posture nodes associated with a human. At 318, the method 300 includes replacing the positional apparatus with a robotic hand. At 320, the method 300 includes performing the assigned task with the robot assembly. At 322, the method 300 includes continuously capturing a plurality of images of the robot assembly as executes the assigned task. At 324, the method 300 includes extrapolating 3D information from the plurality of images. At 326, in response to a recognition of a human approaching the robot assembly and the predetermined movement locations, stopping or changing the predetermined movements of the robot assembly based on predicted extensions of the human using posture nodes. At 328, in response to a recognition of a human crossing a predetermined movement location, stopping or changing the predetermined movements of the robot assembly.

Figure 9:
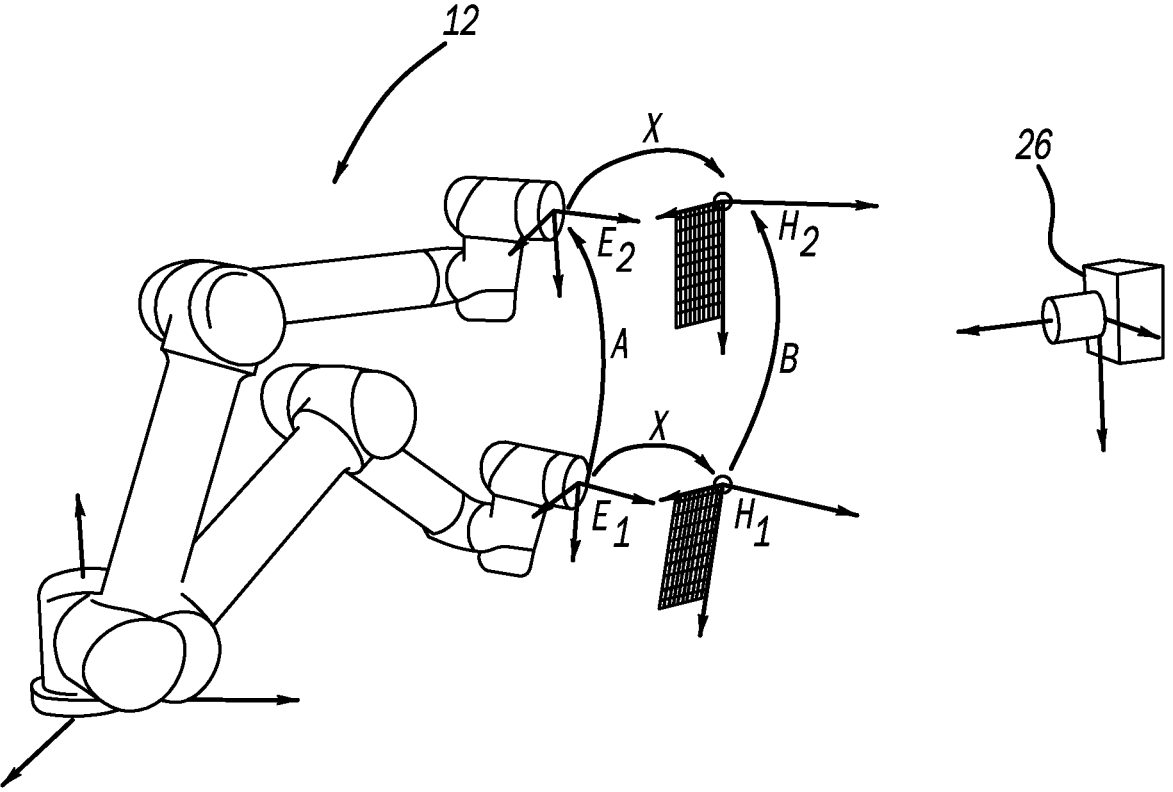
FIG. 9 illustrates a system for performing the method of FIGS. 8A-8B.
Figure 10:
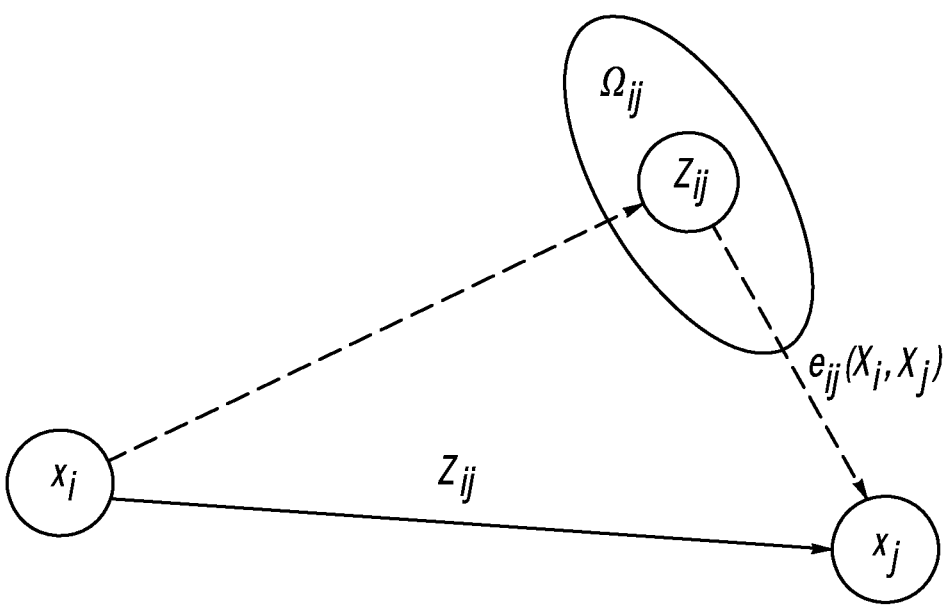
FIG. 10 illustrates a pose-graph generation step.
Figure 11:
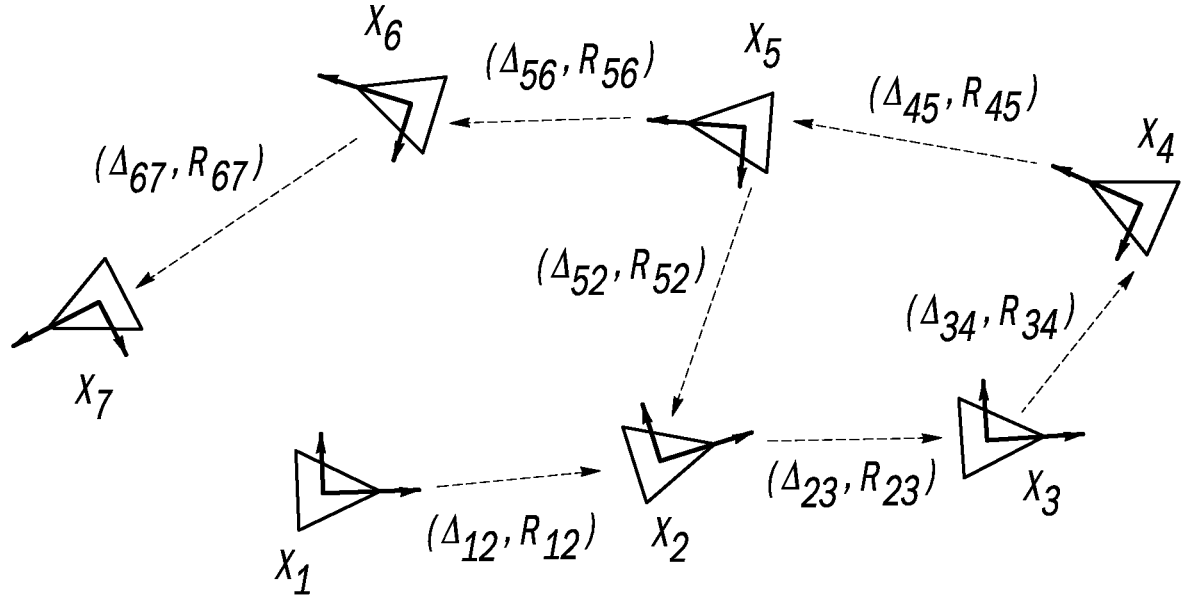
FIG. 11 illustrates additional steps of the pose-graph generation step.

FIGS. 9 through 11 provide additional details of the robot calibration method 300. With initial reference to FIG. 9, the method 300 may include using multiple cameras and solving for AX=YB individually to generate an 3D extrapolated location of the robot assembly 12, such as the hand 62, base 56, or arm 58. FIG. 10 provides a pose-graph generation step, including two states xi and xj of the robot assembly 12 with a relative factor measurement zij. An predetermined path and or bypass path may be generated based on optimal states of xi and xj via the provided posteriori algorithm. FIG. 11 provides additional steps of the pose-graph generation step including generating a model wherein G=(X,Z). The factor X is a set of poses at each state that are vertices of G. The factor Z is a set of all factors which are edges of G. The pose-graph generation can thus be used to estimate a series of states (e.g., location) of the robot assembly.

The system, modules, assemblies, methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes and modules may also, or alternatively, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

It should be appreciated that the foregoing description of the embodiments has been provided for purposes of illustration. In other words, the subject disclosure it is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. A method for operating a robot assembly to prevent collision with a human in a manufacturing setting, the method comprising the steps of:

providing a robot assembly with a positional apparatus having at least one tag; performing predefined movements with the robot assembly associated with an assigned task;

detecting the at least one tag on the positional apparatus with a detector and generating a movement model of the robot assembly; and replacing the positional apparatus with a robotic hand configured to perform tasks associated with the movement model.

2. The method of claim 1, wherein the positional apparatus includes a plurality of sides with each side including at least one tag.

3. The method of claim 2, wherein each of the sides includes at least two distinct tags.

4. The method of claim 1, further comprising capturing a plurality of images of the robot assembly during the assigned task, wherein the images include movement and position of the robot itself.

5. The method of claim 4 further comprising extrapolating 3D information from the plurality of images.

6. The method of claim 5, further comprising continuously capturing additional images and, in response thereto, modifying a predetermined movement of the robot assembly.

7. The method of claim 6, further comprising modeling human posture and generating a plurality of posture modes.

8. The method of claim 7 further comprising capturing images of a human working in close proximity with the robot assembly.

9. The method of claim 8, further comprising extrapolating 3D information from the images of the human working and determining a hazard is present.

10. The method of claim 1 further comprising generating posture nodes associated with a human.

11. The method of claim 10 further comprising determining a range of motion of the human.

12. The method of claim 1 further comprising detecting a human approaching the robot assembly during performance of the predetermined task.

13. The method of claim 12 further comprising stopping or changing the performance of the predefined task in response to detecting the human approaching.

14. The method of claim 1, wherein the method includes providing a system including:

at least one computing device having at least one processor and at least one memory having instructions stored thereon that, when executed by the at least one processor, cause the at least one processor to perform at least one step of the method of claim 1.

* * * * *